(12) United States Patent
Loffink et al.

(10) Patent No.: US 7,848,232 B2
(45) Date of Patent: Dec. 7, 2010

(54) TIME DIVISION MULTIPLEXED COMMUNICATION BUS AND RELATED METHODS

(75) Inventors: John Loffink, Austin, TX (US); Sandor T. Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 744 days.

(21) Appl. No.: 11/520,326

(22) Filed: Sep. 13, 2006

(65) Prior Publication Data

US 2008/0062897 A1   Mar. 13, 2008

(51) Int. Cl.
  H04L 12/28  (2006.01)
  H04L 12/43  (2006.01)
(52) U.S. Cl. ........................ 370/230; 370/257; 370/458
(58) Field of Classification Search .................. 370/216, 370/242, 257, 362, 449, 458, 442, 229, 230, 370/235
  See application file for complete search history.

(56) References Cited

U.S. PATENT DOCUMENTS

| | | | | |
|---|---|---|---|---|
| 4,535,448 A | * | 8/1985 | Baxter et al. | 370/364 |
| 6,115,374 A | | 9/2000 | Stonebridge | 370/362 |
| 6,674,750 B1 | | 1/2004 | Castellano | 370/442 |
| 6,684,354 B2 | * | 1/2004 | Fukushima et al. | 714/718 |
| 6,757,244 B1 | | 6/2004 | Redman | 370/227 |
| 6,978,416 B2 | * | 12/2005 | Widmer | 714/800 |
| 7,042,895 B1 | | 5/2006 | Nguyen | 370/442 |
| 7,093,183 B2 | * | 8/2006 | Chen | 714/785 |
| 2004/0139269 A1 | * | 7/2004 | Nakamura | 710/310 |

OTHER PUBLICATIONS

Condor Engineering, "*MIL-STD-1553 Protocol Tutorial*," Jul. 16, 2004, Version 3.43.

* cited by examiner

*Primary Examiner*—Seema S Rao
*Assistant Examiner*—Mon Cheri S Davenport
(74) *Attorney, Agent, or Firm*—O'Keefe, Egan, Peterman & Enders, LLP

(57) ABSTRACT

A time division multiplexed communication bus is disclosed that provides a low latency, low pin count solution for communications among information handling systems. The time division multiplexed serial bus is advantageous in providing communications among modular computing systems, passthrough modules and chassis management controllers, as part of a modular computing system chassis.

22 Claims, 6 Drawing Sheets

US 7,848,232 B2

TIME DIVISION MULTIPLEXED COMMUNICATION BUS AND RELATED METHODS

TECHNICAL FIELD OF THE INVENTION

This invention relates to techniques for providing communications among information handling systems and, more particularly, for providing communications in modular computing systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are combined to form multiple processing components configured as part of a single system. A modular computing system is one example of such a system that is made up of a number of different information handling systems. A "modular computing system" as a general term is often used to refer to a system architecture that houses multiple server modules or blades in a single chassis. Modular computing systems are widely used, for example, in data centers to save space and improve system management. Either self-standing or rack mounted, a modular computing system chassis typically provides the power supply to the blades, and each blade typically has its own CPU, memory and hard disk. A "blade" as a general term is often used to refer to one component in a system that is designed to accept some number of components (referred to collectively as "blades"). Blades can be, for example, individual servers that plug into a single cabinet or chassis to form a modular computing system, or blades can be individual port cards that add connectivity to a switch. Passthrough modules and CMCs (chassis management controllers) are also often utilized along with blades as part of a modular computing system.

In modular computing systems, it is desirable to provide effective communications among the blades, the passthrough modules (PTMs) and chassis management controllers (CMCs). These communications, for example, can be implemented using dedicated low level signal pins. An efficient, robust solution, however, is needed. In addition, hot-swapping of blades will often create data integrity problems as blades are inserted into and removed from the modular computing system. In addition, low latency is desirable so that the blades, PTMs and CMCs do not have to wait unnecessarily for other systems in order to communicate. Similar communication requirements may also exist for other systems that include a plurality of information handling systems that need to communicate with each other through a communication bus.

SUMMARY OF THE INVENTION

The present invention provides a time division multiplexed (TDM) communication bus that allows for a low latency, low pin count solution for communications among information handling systems. More particularly, the time division multiplexed communication bus described herein is advantageous in providing communications within modular computing systems, for example, communications among blades, passthrough modules (PTMs) and chassis management controllers (CMCs) within such modular computing systems. The TDM communication bus can also utilize a data transmission frame including allocated time slots in which systems transmit data packets, including data for multiple targets, and error check data for the entire data packet. A transmission frame can then be deemed valid if all data packets have valid error check results. As described below, other features and variations can be implemented, if desired, and related systems and methods can be utilized, as well.

In one example embodiment, the present invention can be a method for communicating among a plurality of information handling systems, including providing a communication bus configured to be coupled to a plurality of information handling systems, transmitting on the communication bus a data packet from each information handling system for receipt by the other information handling systems where each data packet includes error check data and where all of the data packets together forming a transmission frame for the communication bus, analyzing the error check data in each received data packet with each information handling system to determine whether data in each data packet is valid, and utilizing the data in each data packet within the information handling systems only if all of the data packets in the transmission frame are valid. In a further embodiment, the method can include forming each data packet to include one or more data bits allocated to each information handling system and generating the error check data for the data packet from all of the allocated data bits. In addition, the method can include configuring the communication bus to be coupled to a predetermined number of information handling systems and configuring each information handling system to transmit on the communication bus in a predefined time slot within the transmission frame. Still further, the information handling systems can include a plurality of blades, a plurality of passthrough modules, and at least one chassis management controller. As described below, other features and variations can be implemented, if desired, and related systems can be utilized, as well.

In another example embodiment, the present invention can be a communication system for a plurality of information handling systems, including a communication bus and a plurality of information handling systems coupled to the communication bus where each information handling system is configured to transmit on the communication bus a data packet including error check data for receipt by the other information handling systems, to analyze error check data in each received data packet, and to utilize data in each data packet only if all of the data packets are valid, such that all the data packets together form a transmission frame for the communication bus. In a further embodiment, each data packet can include one or more data bits allocated to each information handling system and wherein the error check data for the data packet is determined from all of the allocated data bits. In addition, the communication bus can be configured to support a predetermined number of information handling systems such that each information handling system has a predefined time slot within the transmission frame. Still further, each information handling system can be configured to receive its own data packet and to analyze the error check data for its own transmitted data packet. Also, one of the information handling systems can be a master information handling system configured to transmit a synchronization signal on the synchronization signal line to initiate a transmission frame and to control clock signals on the clock signal line. The information handling systems can also include a plurality of blades, a plurality of passthrough modules, and at least one chassis management controller. As described below, other features and variations can be implemented, if desired, and related methods can be utilized, as well.

In yet another example embodiment, the present invention can be information handling system configured to communicate on a communication bus, including an input buffer configured to be coupled to a communication bus, an output buffer configured to be coupled to a communication bus, control circuitry coupled to the output buffer and the input buffer where the control circuitry is configured to transmit a data packet through the output buffer including error check data for receipt by other information handling systems on the communication bus and configured to receive through the input buffer data packets from other information handling systems, such that the control circuitry is further configured to analyze error check data in each received data packet and to utilize data in each data packet only if a plurality of data packets within a transmission frame are valid.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1A:
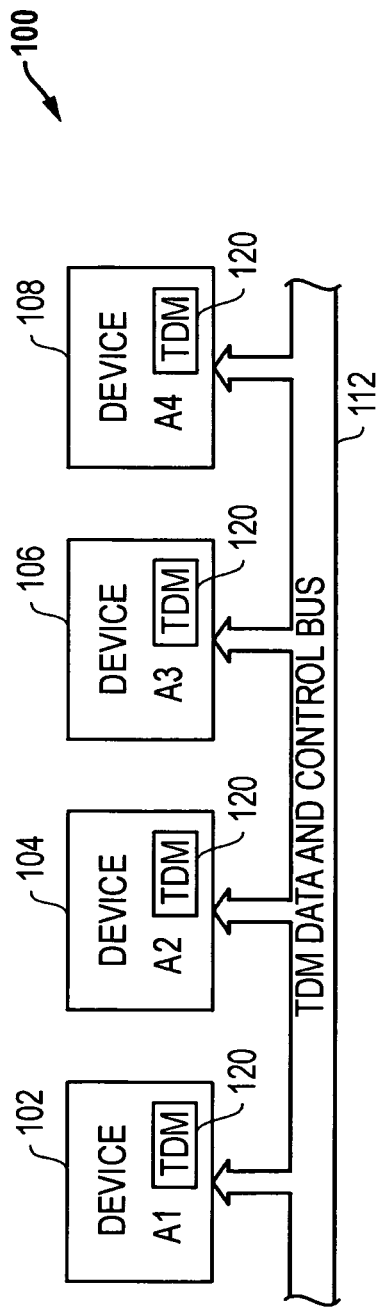
FIG. 1A is a block diagram of multiple information handling system devices that are connected to a time division multiplexed (TDM) communication bus.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In some systems, such as modular computing systems, numerous information handling systems are combined to operate together and often need to communicate with each other. Communications for general purpose and low level control signals for such systems are often implemented as dedicated communication signal paths. An increasingly large number of dedicated pins and signals lines, however, are needed as systems grow in complexity. In addition, these control signals at times have moderate speed requirements combined with low latency requirements and are often implemented as low-voltage-level signal lines. In addition, minimal interaction with microprocessors is often desirable because such interaction could introduce variable timing due to multiple code execution paths for the microprocessors. Examples for control signals where variable timing is not desirable include signals to immediately control power to a blade in a modular computing system chassis, PHY (physical layer) signals between blade mezzanines and I/O (input/output) slot passthrough cards, reset controls for management circuits, and network isolation commands or status.

In complex systems, such as modular computing systems, there is a need for a low voltage level, low pin count, multi-drop control bus having many-to-many status and command passing. Although dedicated signal lines have been used previously, as mentioned above, such solutions can quickly become inefficient and overly complex. For example, in modular computing systems with ten blades passing data between two passthrough modules (PTMs), the number of signal lines grows very quickly if dedicated IO (input/output) signal lines are used. In addition, modular computing system solutions must typically provide hot plugging support and also provide a high degree of data integrity because erroneous reporting can result in catastrophic system behavior of the modular computing systems, such as false shutdowns of the blades or modular computing system chassis.

Figure 1B:
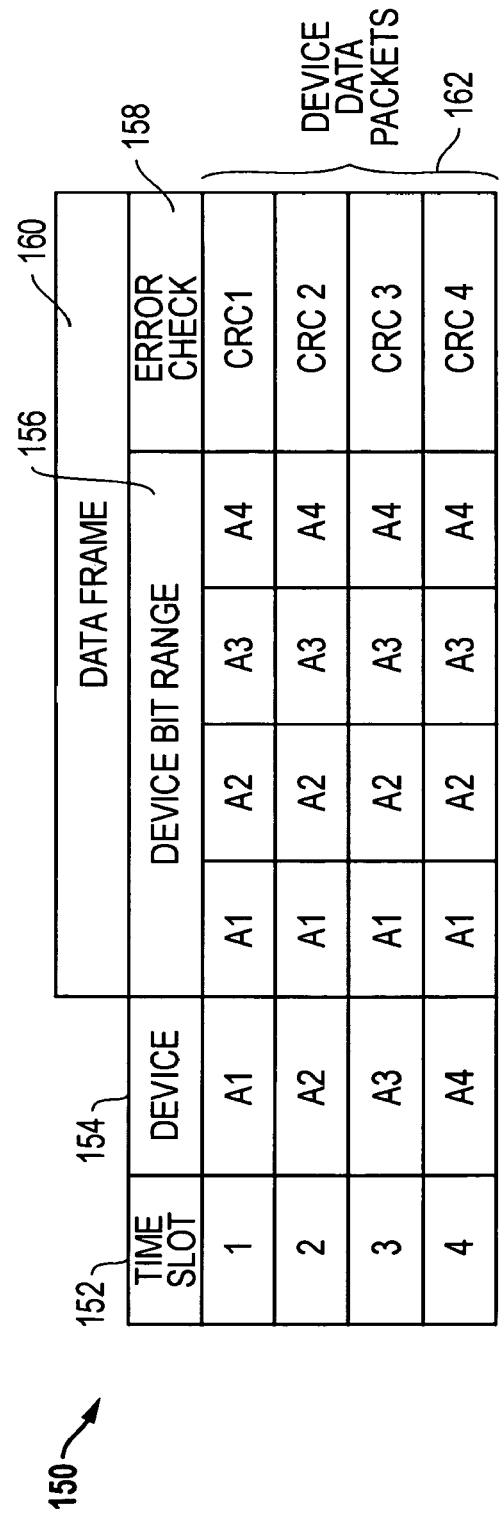
FIG. 1B is a time slot and data packet diagram for communications on the TDM communication bus.
Figure 1C:
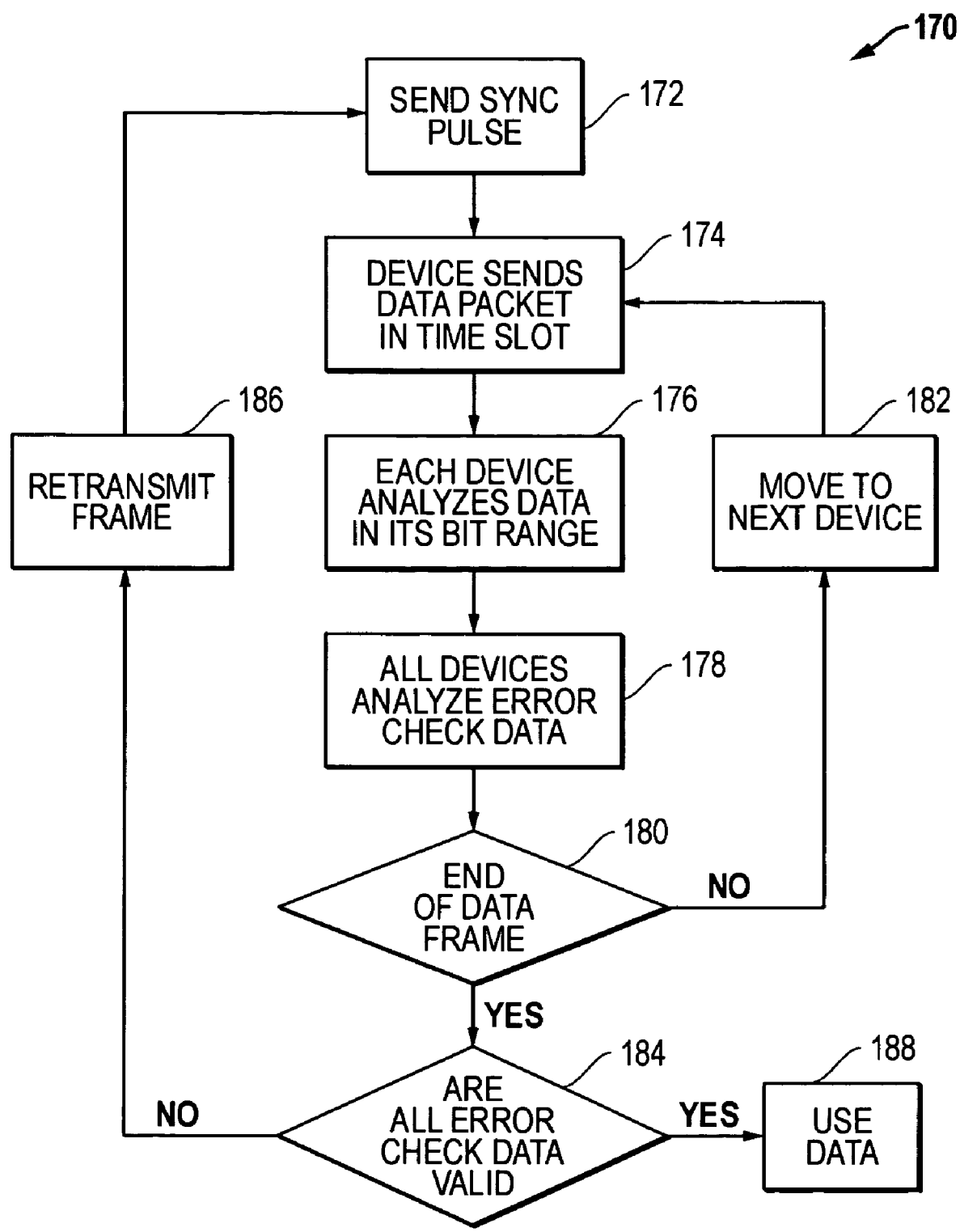
FIG. 1C is a flow diagram for utilizing error correction information from each data packet to determine whether the entire transmission frame is valid.
Figure 2A:
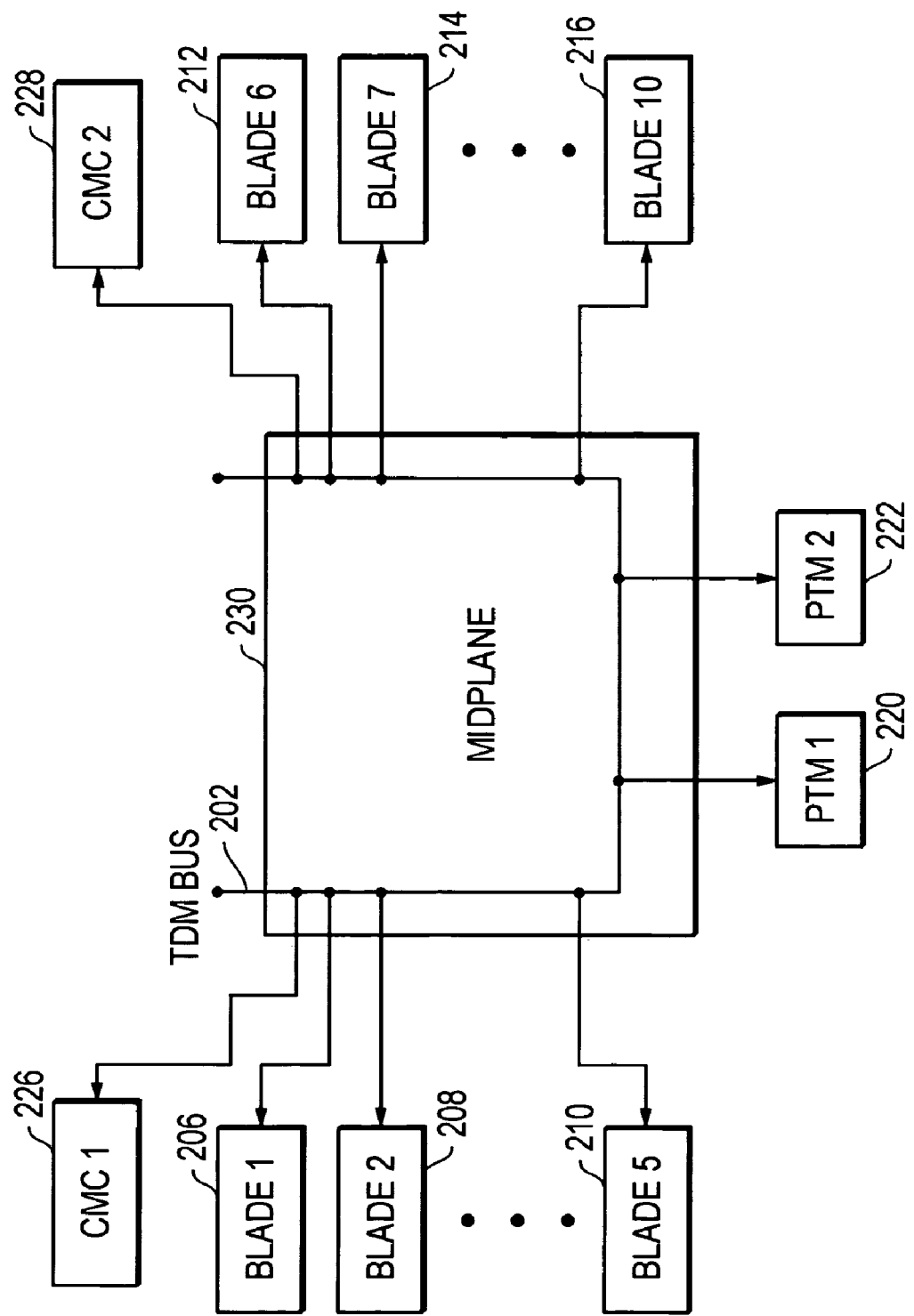
FIG. 2A is a block diagram of multiple modular computing systems, chassis management controllers, and passthrough modules connected together though a TDM bus.
Figure 2B:
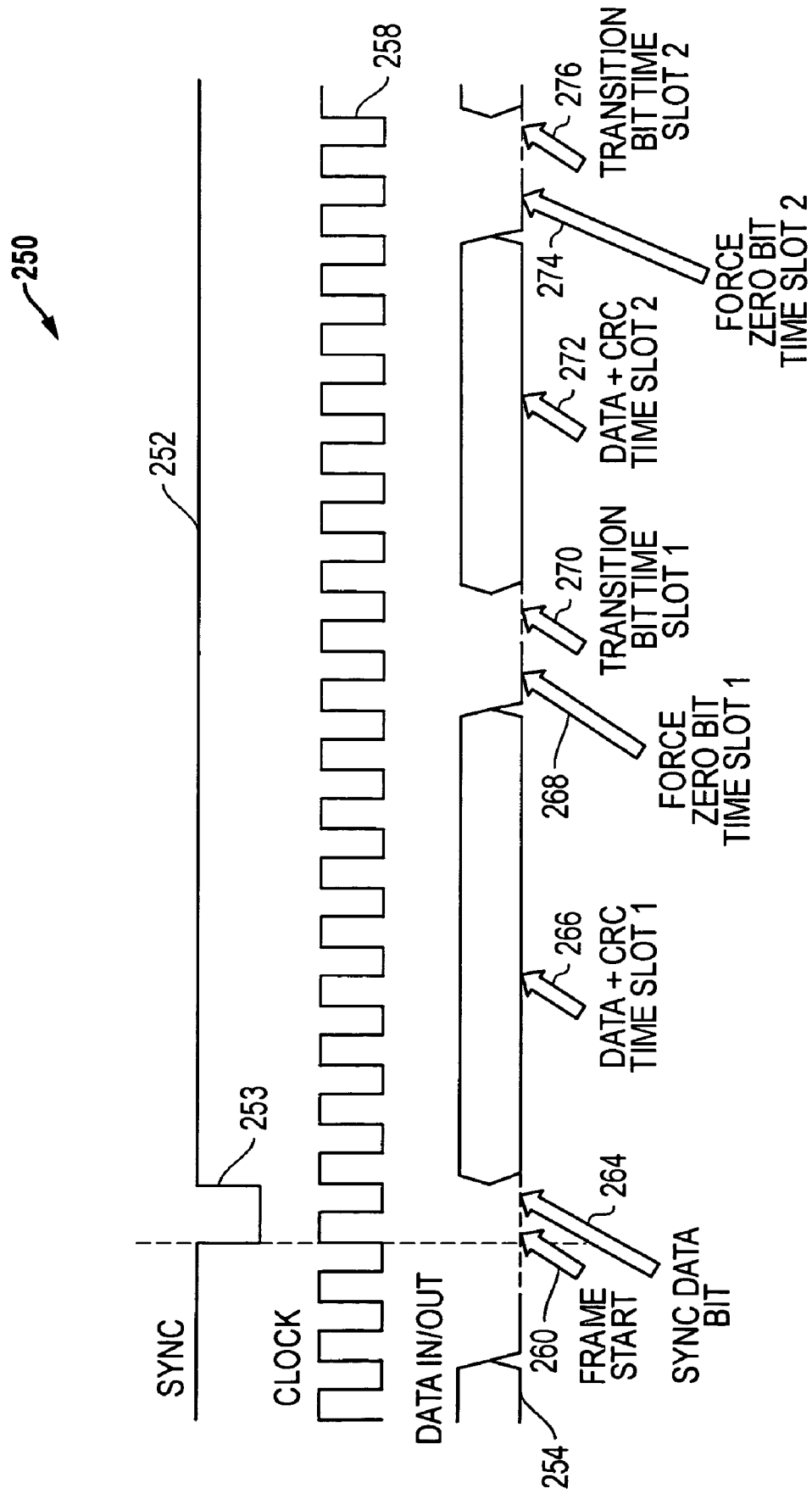
FIG. 2B is a signal diagram of an example embodiment for a 3-wire TDM communication bus including a clock (CLK) signal line, a synchronization (SYNC) signal line, and a data input/output (DATA I/O) signal line.
Figure 2C:
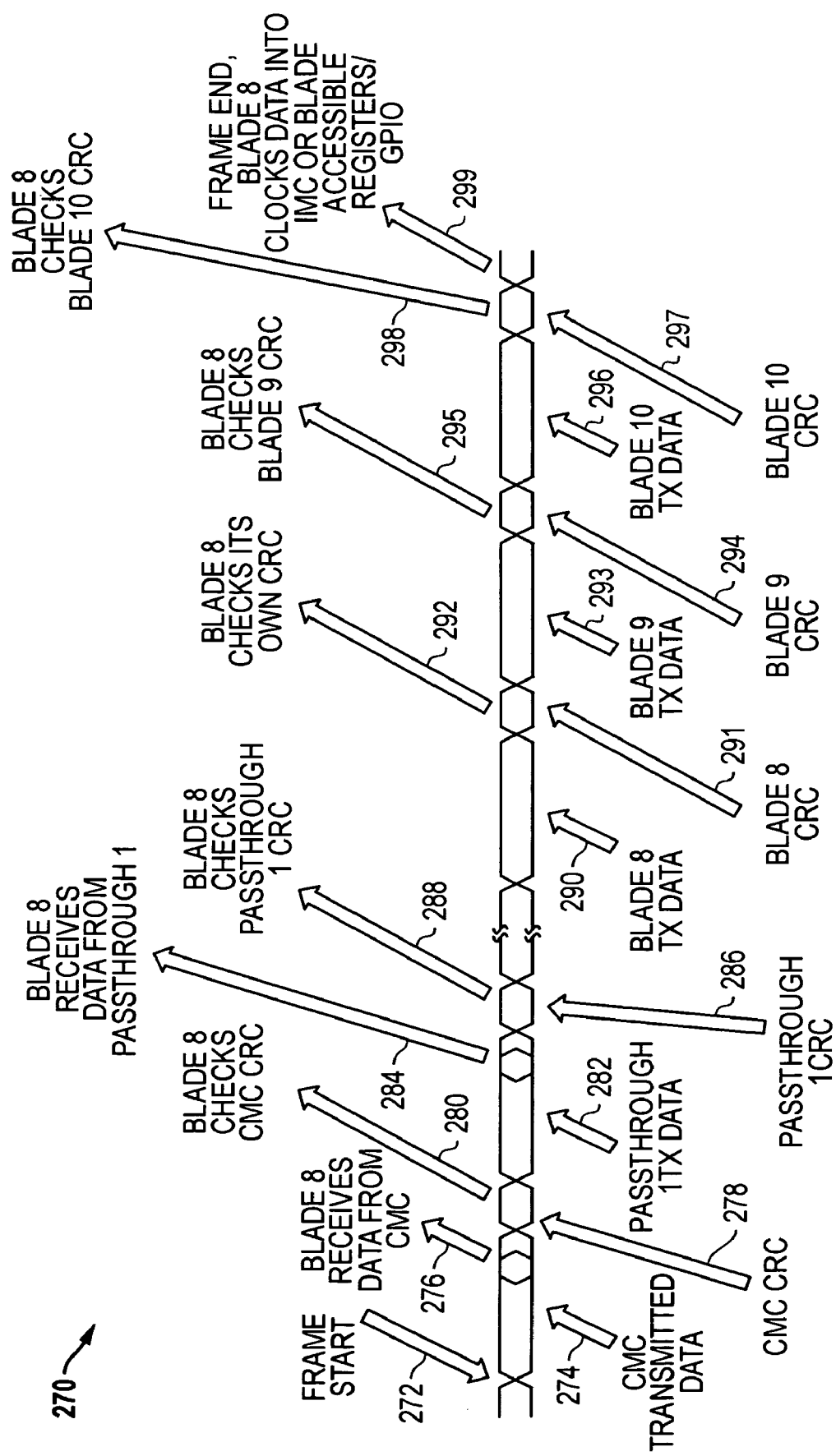
FIG. 2C is a signal diagram for error check processing for an example modular computing system.
Figure 3:
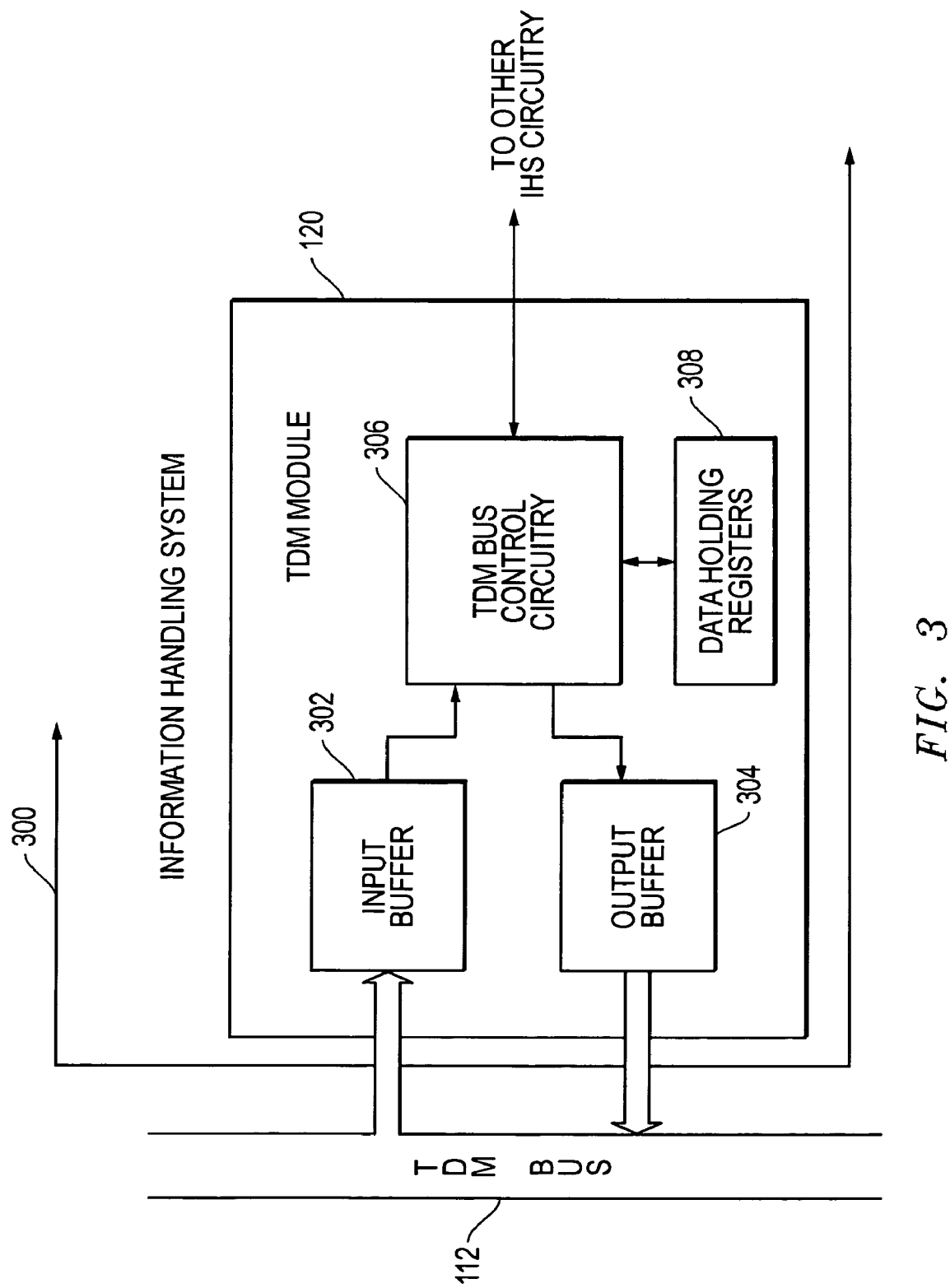
FIG. 3 is a block diagram for a TDM module that can be included within information handling systems coupled to the TDM communication bus.

As described herein, the present invention provides a time division multiplexed communication bus for communications among information handling systems. FIGS. 1A, 1B and 1C provide a general example of an implementation of a communication bus utilizing a data transmission frame including allocated time slots in which systems transmit data packets including data for multiple targets and error check data for the entire data packet. FIGS. 2A, 2B and 2C provide a modular computing system related implementation utilizing a three-wire serial communication bus. And FIG. 3 provides a block diagram for a time division multiplexed (TDM) module that can be used to interface with the TDM communication bus.

FIG. 1A is a block diagram of an embodiment 100 for multiple information handling system devices that are connected to a time division multiplexed bus. In particular, device 102 (DEVICE A1), device 104 (DEVICE A2), device 106 (DEVICE A3) and device 108 (DEVICE A4) are coupled to the time division multiplexed (TDM) data and control bus 112. It is noted that any number of devices of any desired device type can be coupled to the TDM data and control bus 112. It is also noted that the TDM bus 112 can be implemented as a multi-line serial bus with a single data signal line, as discussed below. It is further noted, however, that other implementations for the TDM bus 112 could also be utilized, including multiple data lines to provide parallel data processing. In addition, another implementation, if desired, could reduce the number of lines to a single signal line by combining synchronization and clocking information on the signal line combined with data. In addition, the number of signal lines could be reduced such that the serial bus includes two signal lines such as through providing signal lines having various combinations of the sync, clock and data signal information. Thus, the TDM bus can be implemented with one or more signal lines, as desired, each being configured to carry any combination of one or more data signals, as desired.

In the embodiment depicted in FIG. 1A, device 102 (DEVICE A1), device 104 (DEVICE A2), device 106 (DEVICE A3) and device 108 (DEVICE A4) each include a TDM module 120 that facilitates and helps to control communications on the TDM bus 112. In part, for example, the TDM module 120 for each device can be configured to determine the particular time slot within a transmission frame that will be used by its device, as discussed in more detail below. The TDM module 120 can be implemented as an ASIC (application specific integrated circuit), for example, through the use of FPGA (field programmable gate array) circuitry or CPLD (complex programmable logic device) circuitry. Alternatively, the TDM module 120 could also be implemented in software. It is further noted that any combination of hardware or software implementations could also be utilized for the TDM module 120, as desired.

Data transmissions on the TDM bus 112 are implemented using a transmission frame during which each device is allocated a timeslot in which to communicate a data packet. In addition, each data packet includes a set of bits or a bit range that is dedicated to the devices expected to be on the TMD bus 112. Each device receives each data packet transmitted by the other devices and analyzes it for information within its bit range. For example, device 102 (DEVICE A1) will analyze the bit range allocated to device 102 (DEVICE A1) within each data packet transmitted by the other devices on the TDM bus 112. In addition, as further explained below, each data packet also includes bits allocated for error check operations, and these error check bits in each transmitted data packet are analyzed by all the devices. If the error check data for all the transmitted data packets within a data transmission frame show that no failures have occurred, then the data packets in the transmission frame are accepted as good and utilized by the devices. If any one of the error checks shows a failure, then none of the data packets are accepted, and the transmission frame is repeated. This technique of spreading error check operations across multiple data packets helps improve data integrity, for example, when devices are hot swapped into and out of connection with the TDM bus 112.

FIG. 1B is an example embodiment 150 for a transmission frame 160 including time slots (SLOTS 1-4) and data packets 162 for communications on the TDM bus by device 102 (DEVICE A1), device 104 (DEVICE A2), device 106 (DEVICE A3) and device 108 (DEVICE A4) of FIG. 1A. As shown, the table includes a time slot column 152, a device column 154 and a data transmission frame 160. The data transmission frame 160 includes four device data packets with one data packet being associated with each time slot. Each data packet within the data transmission frame 160 includes error check data 158 and device data made up of a plurality of device bit ranges 156. The transmission frame 160, as shown, includes a time slot for each device. In particular, time slot 1 is for data packets transmitted by device A1. Time slot 2 is for data packets transmitted by device A2. Time slot 3 is for data packets transmitted by device A3. And time slot 4 is for data packets transmitted by device A4. Within each time slot, bits are allocated to each device. Each data packet includes error check bits, as well, which can be, for example, CRC (cyclical redundancy check) data related to the device data bits in the data packet.

Looking first to time slot 1, it is allocated to data transmissions by device A1. The data packet for this time slot includes the following device data in the device bit ranges 156 and error check data 158:

| Time Slot 1 - Device A1 Data Packet | |
|---|---|
| X-bits | N/A |
| X-bits | Transmit data from A1 to A2 |
| X-bits | Transmit data from A1 to A3 |
| X-bits | Transmit data from A1 to A4 |
| Y-bits | Error check data for A1 data packet (CRC1) |

Looking to time slot 2, it is allocated to data transmissions by device A2. The data packet for this time slot includes the following device data in the device bit ranges 156 and error check data 158:

| Time Slot 2 - Device A2 Data Packet | |
|---|---|
| X-bits | Transmit data from A2 to A1 |
| X-bits | N/A |
| X-bits | Transmit data from A2 to A3 |
| X-bits | Transmit data from A2 to A4 |
| Y-bits | Error check data for A2 data packet (CRC 2) |

Looking to time slot 3, it is allocated to data transmissions by device A3. The data packet for this time slot includes the following device data in the device bit ranges 156 and error check data 158:

| Time Slot 3 - Device A3 Data Packet | |
|---|---|
| X-bits | Transmit data from A3 to A1 |
| X-bits | Transmit data from A3 to A2 |
| X-bits | N/A |
| X-bits | Transmit data from A3 to A4 |
| Y-bits | Error check data for A3 data packet (CRC 3) |

Looking to time slot 4, it is allocated to data transmissions by device A4. The data packet for this time slot includes the following device data in the device bit ranges 156 and error check data 158:

| Time Slot 4 - Device A4 Data Packet | |
| --- | --- |
| X-bits | Transmit data from A4 to A1 |
| X-bits | Transmit data from A4 to A2 |
| X-bits | Transmit data from A4 to A3 |
| X-bits | N/A |
| Y-bits | Error check data for A4 data packet (CRC 4) |

Thus, as shown in FIG. 11B, each device has a dedicated time slot for communications of its data packets. Within each data packet, each device has a dedicated bit range within which is placed data directed to that device. This bit range is indicated as "X" bits for each device where X can be any desired integer. Each data packet communicated by a device also includes error check data. This bit range is indicated as "Y" bits for the error check data, where Y can be any desired integer. For each data packet, each of the devices will read the data within its bit range to determine if data has been sent to it by the device owning the time slot. For each data packet, each of the devices will also analyze the error check data so that each device is analyzing the error check data in all of data packets. If the error check data for all of the time slots indicate no failure has occurred, then the data in the transmission frame is deemed to be valid data and utilized. The devices store the data until the whole transmission frame is completed. In addition, each device can analyze the error check data in its own data packet, if desired.

FIG. 1C is an example embodiment 170 of a flow diagram for utilizing error check data from each data packet to determine whether the entire transmission frame is valid. The process starts in step 172 with a master device sending a synchronization (SYNC) pulse to start the transmission frame. In block 174, the device having the first timeslot sends its data packet. Next, in block 176, each device on the TDM bus analyzes the data in its bit range. In block 178, all devices analyze the error check data. In decision block 180, a determination is made whether the end of the transmission frame has been reached with all devices commuting its data packet. If the determination is "no," then block 182 is reached where the process moves to the next device. Process flow then goes back to block 174 where this next device send its data packet in its timeslot. This process continues until the end of the data from has been reached and the determination is "yes" in decision block 180. Next, in decision block 184, each device analyzes the error check data from each data packet to determine if all the check data information is valid. If "yes," then block 188 is reached where the data in the transmission frame is taken as valid and used. If "no," then block 186 is reached where the transmission frame is retransmitted and the data is discarded.

It is noted that the TDM bus can be utilized with one or more device types. If desired, the devices of a particular device type can be grouped together for data packet communications, and each device type can have a different number of dedicated bits in the data packet. FIG. 2A provides an example modular computing system environment with multiple device types coupled to a TDM bus, namely blades, CMCs (chassis management controllers) and passthrough modules. FIG. 2B provides an example embodiment for the TDM bus used in FIG. 2A, and FIG. 2C provides example signals for error check operations.

FIG. 2A is a block diagram of multiple blades, CMCs (chassis management controllers) and passthrough modules (PTMs) connected to communicate with each other through a TDM bus. In particular, midplane 230 includes circuitry that provides a TDM bus 202 along with other desired circuitry to provide connection circuitry for a modular computing system chassis. As described below, the TDM bus 202 can be implemented with three signal lines, namely, a clock (CLK) signal line, a synchronization (SYNC) signal line, and a data input/output (DATA IO) signal line.

As depicted, the midplane 230 includes connections for two CMCs (chassis management controllers). A first CMC (CMC 1) 226 is coupled to the TDM bus 202 on the left side of the midplane 230, and a second CMC (CMC 2) 228 is coupled to the TDM bus 202 on the right side of midplane 230. The midplane 230 also includes connections for up to ten (10) blades. The BLADE1 206, blade BLADE2 208 . . . and BLADE5 210 are coupled to the TDM bus 202 on the left side of the midplane 230. The BLADE6 212, BLADE7 214 . . . and BLADE10 216 are coupled to the TDM bus 202 on the right side of the midplane 230. Further, the midplane 230 includes connections for two passthrough modules (PTMs). The passthrough module (PTM1) 218 and the passthrough module (PTM2) 224 are coupled to the TDM bus 202 on the bottom of midplane 230.

It is noted that other configurations and combinations of PTMs, CMCs and blades could be utilized, if desired. It is further noted that a dedicated master device could be utilized such that this device is always the master of the TDM bus. In addition, other techniques for determining a master device could also be utilized, as desired. It is further noted that each of the devices in FIG. 2A could also include a TDM module 120 as discussed above.

FIG. 2B is a signal diagram 250 for an example 3-wire TDM bus including a clock (CLK) signal line 258, a synchronization (SYNC) signal line 252, and a data input/output (DATA I/O) signal line 254. The master device sends a synchronization pulse 253 on the synchronization (SYNC) signal line 252 to start a transmission frame cycle. Arrow 260 (FRAME START) and the associated dotted line represent this start of a transmission frame. In addition to sending the synchronization pulse 253, the master device also provides the clock signal on the clock (CLK) signal line 258. The data input/output (DATA IO) signal line 254 is used by each device to send its data packet during its timeslot.

As shown, the first data packet is transmitted after the initial synchronization pulse 253 has completed as represented by arrow 264 (SYNC DATA BIT). Arrow 266 (DATA+CRC–TIME SLOT 1) represents the device data and error check data that is communicated by the device allocated the first time slot (TIME SLOT 1). After transmission of this data packet has been completed, a forced-zero bit is sent as represented by arrow 268 (FORCE ZERO BIT–TIME SLOT 1). A transition bit for the first timeslot then follows as represented by arrow 270 (TRANSITION BIT–TIME SLOT 1). This transition bit allows time for control to pass from the device owning time slot 1 to the device owning time slot 2. Arrow 272 (DATA+CRC–TIME SLOT 2) represents the device data and error check data that is communicated by the device allocated the second time slot (TIME SLOT 2). After transmission of this data packet has been completed, a forced-zero bit is sent as represented by arrow 274 (FORCE ZERO BIT–TIME SLOT 2). Again, a transition bit for the second timeslot then follows as represented by arrow 276 (TRANSITION BIT–TIME SLOT 2). The next data packet begins, and so on, until each device coupled to the TDM bus transmits its data packet during its allocated time slot. After the final transition bit of a frame, a new synchronization pulse 253 is sent by the primary device to start a new transmission frame.

As discussed with respect to FIG. 1B above, the data packet in each time slot will include bit ranges dedicated to each of the devices that is or could be coupled to the TDM bus. With respect to FIG. 2A, the devices configured for connection into the modular computing system includes 1 or 2 CMCs, 2 PTMs, and 10 blades. In this modular computing system, the PTMs are configured to communicate data to blades; the CMCs are configured to communicate data to the blades; and the blades are configured to communicate data to the PTMs or the CMCs. Because each of these device types are communicating with different sets of devices, the data packets for the different device types can be different.

The following table provides an example data packet that could used by the CMCs to communicate blades on the TDM bus. The two possible CMCs that may be coupled to the embodiment of FIG. 2A are allocated the first two time slots. And the CMCs are configured to communicate with GPIO (general programmable input output) pins for the blades.

| Time Slots (1-2) - CMC X Data Packet | |
|---|---|
| Bits 1-9 | CMC X to Blade 1 GPIO |
| Bits 10-18 | CMC X to Blade 2 GPIO |
| ... | ... |
| Bits 82-90 | CMC X to Blade 10 GPIO |
| Bits 91-106 | 16-bit CRC |
| Bit 107 | Force zero bit |
| Bit 108 | Transition bit |

The following table provides an example data packet that could used by the PTMs to communicate with blades on the TDM bus. The two possible PTMs that may be coupled to the embodiment of FIG. 2A are allocated the next two time slots. And the PTMs are configured to communicate with GPIO (general programmable input output) pins for the blades.

| Time Slots (3-4) - PTM X Data Packet | |
|---|---|
| Bits 1-2 | PTM X to Blade 1 GPIO |
| Bits 3-4 | PTM X to Blade 2 GPIO |
| ... | ... |
| Bits 19-20 | PTM X to Blade 10 GPIO |
| Bits 21-36 | 16-bit CRC |
| Bit 37 | Force zero bit |
| Bit 38 | Transition bit |

The following table provides an example data packet that could used by the blades to communicate with PTMs and the CMCs on the TDM bus. The ten possible blades that may be coupled to the embodiment of FIG. 2A are allocated the last sixteen time slots. And the blades are configured to communicate with GPIO (general programmable input output) pins for the PTMs.

| Time Slots (5-14) - Blade X Data Packet | |
|---|---|
| Bits 1-5 | Blade X to PTM 1 GPIO |
| Bits 6-10 | Blade X to PTM 2 GPIO |
| Bits 11-17 | Blade X to CMC 1 |
| Bits 18-24 | Blade X to CMC 2 |
| Bits 25-40 | 16-bit CRC |
| Bit 41 | Force zero bit |
| Bit 42 | Transition bit |

Thus, for the system configuration of FIG. 2A, the TDM communications are configured such that each device that may be included in the system has its own time slot for communications. Each device then receives the transmitted data packets and reads the data directed to its bit range and the CRC data. If a device is absent from the system, then nothing is transmitted on the TDM bus during that time slot. As discussed below, the DATA I/O signal line 254 can be held at zero during the time slot for an absent or non-operational device.

It is noted that the TDM bus can have pull-down termination circuitry if desired. For example, the SYNC signal line 252, the CLK signal line 258 and the DATA I/O signal line 254 can have weak pull-down resistors coupled to ground (e.g., about 1M ohm) to reset synchronization during hot plug/pull events, and to guarantee a known state in unoccupied frame time slots. If desired, this pull-down circuitry can be located on TDM modules 120. In addition, Schmitt triggers can be included on all inputs to help prevent noise from toggling the inputs when they are going through the signal transition region. This toggling may happen, for example, during hot pull events. A filtering network can also be included with the Schmitt triggers to help reduce the effect of noise by providing hysteresis during the RC ramp of the input signals.

In operation, the TDM primary device drives the clock (CLK) signal line 258 and the frame synchronization (SYNC) signal line 252. In the embodiment depicted, there is only one TDM primary device at a time, which is a CMC or PTM. The other devices are TDM secondary devices that receive clock (CLK) and frame synchronization (SYNC) from the TDM primary device. Any of the devices in FIG. 2A can be TDM secondary devices. Each device will be a TDM transmitter during its time slot, and each device will be a TDM receiver during all other time slots.

The TDM receivers decode device data and CRC data from each TDM transmitter; however, each device discards data not specified for its bit range. A data transmission frame includes the time from one sync pulse to the next and contains all communications between TDM transmitters and TDM receivers. In each time slot within the frame, one TDM Transmitter will transmit its entire packet of information, including the device data, CRC data and the force-zero bit. The sync data bit is one bit cycle on DATA I/O signal line 254 at the beginning of every frame that coincides with the synchronization pulse 253. No device transmits during this bit cycle, as the synchronization pulse 253 is used to determine that the frame has started. The first TDM data transmission begins immediately following this bit. The force-zero bit at the end of each date packet is used to force the bus low immediately before the transition bit. The transition bit is a one bit cycle before each data packet where no TDM transmitters are transmitting data. This transition bit allows turnover time when transitioning from one TDM transmitter to another.

It is noted that various additional operational implementation details could also be adopted, if desired. For example, on the DATA I/O signal line 254, data may be transmitted on clock rising edges and read on clock falling edges. The synchronization pulse 253 may be a rising edge triggered event. By using the pull-down resistors discussed above and by utilizing a force-zero bit as shown in FIG. 2B, the undriven CLK signal line 258 and SYNC signal line 252 are fairly certain to be zero. The force-zero bit operation helps the weak pull-down circuits, if used, which alone would take multiple bit cycles to guarantee a low or null value on the TDM bus. Further bus timing and control mechanisms could also be utilized as desired.

It is also noted that redundant TDM busses could also be utilized so that a backup bus exists should something fail on the primary TDM bus. Each TDM receiver device can monitor the CLK and SYNC signal lines for valid signals. Only one of the two redundant TDM busses would be driven at a time. Once the device detects a complete SYNC pulse and CLK frame, the data reception and transmission can be activated on the receiver. This enables a TDM receiver device to have only one data engine. If activity is detected on both the primary TDM bus and the secondary TDM bus, then the logic within the device or the TDM module within the device will select one of the TDM busses for default data traffic. This dual activity condition can be deemed a non-fatal error and can be reported to the CMC processor.

As discussed above, each device on the TDM bus has a pre-programmed time slot within the transmission. This pre-programming can be based upon definition statements in the logic programming within the device, for example, logic programming with respect to a TDM module on each device. As discussed above, each frame time slot can be configured to have its own bit packing structure that may be preprogrammed per device type. Some frame time slots may require many bits and some just a few bits, depending upon the communications desired to other devices on the TDM bus. It is noted that other implementations could be configured, as desired. For example, embedded addressing could also be utilized with respect to the TDM bus to help allow for larger and/or more flexible types of data to be transferred. In addition, parallel data could be created by serially de-multiplexing data from the TDM bus. Further variations and configurations could also be utilized while still taking advantage of a TDM bus according to the present invention.

FIG. 2C is a signal diagram 270 for error check processing for an example blade, such as BLADE14, in a system where there is a single CMC. It is noted that the force-zero bit and the transition bit for each data packet are left out of FIG. 2C.

Arrow 272 (FRAME START) represents the start of the transmission frame. Arrow 274 (CMC TRANSMITTED DATA) represents the first data packet that is transmitted by the CMC. Arrow 276 (BLADE 8 RECEIVES DATA FROM CMC) represents the receipt by BLADE 8 of the data bits within the data packet that were allocated to BLADE 8. Arrow 278 (CMC CRC) represents the error check data sent by the CMC for the data within its data packet. Arrow 280 (BLADE 8 CHECKS CMC CRC) represents BLADE 8 reading and checking the CRC data for the data packet sent by the CMC.

Arrow 282 (PASSTHROUGH 1 TX DATA) represents the next data packet that is transmitted by the first PTM. Arrow 284 (BLADE 8 RECEIVES DATA FROM PASSTHROUGH 1) represents the receipt by BLADE 8 of the data bits within the data packet that were allocated to BLADE 8. Arrow 286 (PASSTHROUGH 1 CRC) represents the error check data sent by PTM 1 for the data within its data packet. Arrow 288 (BLADE 8 CHECKS PASSTHROUGH 1 CRC) represents BLADE 8 reading and checking the CRC data for the data packet sent by PTM 1.

The process then continues with each subsequent device sending its data packet. For each data packet, BLADE 8 reads the bits in the bit range allocated to BLADE 8. BLADE 8 also reads and checks the CRC data for that data packet. This continues and is picked back up in FIG. 2C with the data packet for BLADE 8.

Arrow 290 (BLADE 8 TX DATA) represents the data packet that is transmitted by BLADE 8 itself. Arrow 291 (BLADE 8 CRC) represents the error check data sent by BLADE 8 for the data within its data packet. Arrow 292 (BLADE 8 CHECKS ITS OWN CRC) represents BLADE 8 reading and checking the CRC data for the data packet it transmitted.

Arrow 293 (BLADE 9 TX DATA) represents the data packet that is transmitted by BLADE 9. Arrow 294 (BLADE 9 CRC) represents the error check data sent by BLADE 9 for the data within its data packet. Arrow 295 (BLADE 8 CHECKS BLADE 9 CRC) represents BLADE 8 reading and checking the CRC data for the data packet sent by BLADE 9.

Arrow 296 (BLADE 10 TX DATA) represents the data packet that is transmitted by BLADE 10. Arrow 297 (BLADE 10 CRC) represents the error check data sent by BLADE 10 for the data within its data packet. Arrow 298 (BLADE 8 CHECKS BLADE 10 CRC) represents BLADE 8 reading and checking the CRC data for the data packet sent by BLADE 10.

As represented by arrow 299 (FRAME END), the frame ends once BLADE 10 has finished transmitted its device data and CRC data. At this point, if BLADE 8 determines that the CRC data in each data packet has indicated valid data, BLADE 8 will utilize the data directed to it during the transmission frame. As such, BLADE 8 may be configured to clock data into an IMC (integrated management controller) or registers accessible to BLADE 8 through its GPIO pins.

In the example tables above, the TDM bus communications were configured to use CRC (cyclical redundancy check) data as error check data to verify each data packet from a TDM transmitter device. In particular, each data packet above includes a 16-bit CRC. Rather than simply have this CRC data checked by a single target device, the resiliency of the data integrity against hot plug or pull events is improved by having each TDM device receive and check each transmitted CRC for all data packets within a transmission frame. For a single 16-bit CRC, this technique helps to provide the following results per time slot:

Up to 100% detection of single-bit errors;
Up to 100% detection of all adjacent double-bit errors;
Up to 100% detection of any errors spanning up to 16-bits;
Up to 100% detection of all two-bit errors not separated by exactly $2^{16}-1$ bits; and
For arbitrary multiple errors spanning more than 16 bits, at worst 1 in $2^{16}$ failures, which is nonetheless over 99.995% detection rate. The risk of error is $1.5*10^{-5}$.

Other types of error checking could also be utilized as desired. For example, CRCs other the sixteen bits could be used, and other techniques could also be implemented such as error correcting codes (ECC), parity bits, checksums and/or any other desired error correction techniques.

It is noted that the risk of an undetected error is a function of the number of frame time slots and the data integrity for each individual CRC. With thirteen frame time slots (e.g. single CMC in the embodiment above) and 16-bit CRCs, the risk of an undetected error from random data corruption in a fully populated system with one CMC, ten blades and two passthrough modules is $(1/(2^{16}))^{13}$, or $2.4*10^{-63}$. For a minimally populated system with one CMC, one blade and no passthrough modules, the risk of an undetected error from random data corruption is $(1/(2^{16}))^2$, or $2.3*10^{-10}$. For an average populated system with one CMC, six blades and one passthrough modules, the risk of an undetected error from random data corruption is $(1/(2^{16}))^8$, or $2.9*10^{-39}$.

It is further noted that a device may be absent from the system. In such a case, the time slot allocated to this device will not have data being transmitted. Thus, in addition to checking for valid CRCs, each TDM device also checks for a null data time slot, in case the device for that time slot is not operating in the system. With the effect of the force-zero bit and pull-downs discussed above, the DATA I/O signal line will stay low during this null time slot. The null data packet will then be all zeroes for both device data and CRC data within the data packet for the null time slot. If desired, other mechanisms could also be utilized to detect empty data slots. For example, pull-up based circuitry and a force-one bit could be utilized rather than the pull-down circuitry discussed above. Other variations and mechanisms could be implemented as desired.

The devices discussed above may also utilize temporary holding registers to store data from the data packets during a transmission frame. As each device is reading its bit range within each data packet, it is also reading and checking the CRC for each data packet, including its own time slot and data packet, as each time slot device data and CRC data is received. Null data for a time slot, due to an unoccupied slot, is recognized as having a valid CRC. If all CRCs match the data for all of the data packets, then all data that the device received within the transmission frame is considered valid. Data is then clocked from the temporary holding registers into the actual device registers or GPIOs accessed by the IMC or blade. This clocking in of the temporarily stored data can occur at the end of the frame. If CRCs for all time slots within a frame do not match the data, the entire transmission frame is thrown away and an error accumulator is incremented. CRC error accumulator overflow is not allowed. The CRC error accumulator can be non-wrapping and generate an interrupt to the local system management processor whenever a certain value is reached. This value can be determined based upon implementation decision, as the frequency of CRC errors will be dependent on the mechanical and electrical characteristics of the system during hot plug and pull cycles. Error accumulators can be cleared when they are read, if desired. As discussed above, the CRC checking cycle restarts with every transmission frame. It is also noted that the transmitted TDM device also reads back its own data packet and checks the CRC data. An error in its own data packet transmission can, for example, help detect a bus contention.

FIG. 3 is a block diagram for a TDM module 120 that can be included within an information handling system 300 coupled to the TDM bus 112. As depicted, an input buffer 302 and an output buffer 304 are coupled to the TDM bus 112. The input buffer 302 and the output buffer 304 are also coupled to TDM bus control circuitry 306, which in turn communicates with other information handling system (IHS) circuitry within the information handling system 300. The control circuitry 306 can be configured to implement and automate the operational details discussed herein. In addition, as discussed above, data holding registers 308 can also be used and can be coupled control circuitry 306.

The TDM bus and system implementation can also include various error reporting features, if desired. Each TDM device can have the ability to collect and report errors on the TDM bus through the use of CRCs. In addition, each blade can also be configured to send an acknowledge bit in its next data packet to confirm that it received a valid packet from CMCs or PTMs within the previous frame. For instance, if PTM B1 transmits data with CRC to BLADE1. BLADE1 compares locally generated CRCs with the received CRCs, and if this comparison indicates that the data was valid, BLADE1 stores a bit to report back to PTM B1 in its next transmission cycle. BLADE1 then sends in its next data packet such an acknowledge bit for each CMC and PTM that sent it valid data in its previous data packet. With the CRCs and acknowledge bits, the CMC has the ability to determine whether both transmitted and received data are without error. The CMC can use this information locally and compare it with the blade inventory to determine whether a blade's TDM bus is working.

It is further noted that connections to the TDM bus can be implemented using an output buffer and an input buffer. The output signal can be written, for example, through a current limiting resistor into the shifty bus DATA I/O signal line. This write can occur on the rising edge of the clock signal, if desired. The input signal can be received by monitoring the DATA I/O signal line at the same time. This data read can occur on the falling edge of the clock signal, if desired. If the read data is not equal to the written data by the read time (falling clock edge), bus contention can be flagged and the driver circuitry will be high impedance for the rest of the frame. This operation is mainly to protect the integrated circuit providing the TDM module for the device, but my also be useful to detect mastership conflicts or system integrity (S1) issues (e.g., miscounted clocks). The flag could go to a debug pin or could be monitored by IMC as part of system health indication. This method may also be used by the PTMs to determine whether to drive the primary TDM bus or the redundant TDM bus. It is not necessary for CMCs to do this operation as the dual CMCs provide redundancy in that case.

Robust fault recovery techniques may also be implemented for the TDM bus. The CMC may monitor CRCs across all time slots, acknowledge bits from each blade, and the CLK and SYNC signal lines. As the CMC monitors CRCs across all time slots as part of the data integrity function, if a specific number of frames are invalidated, to be determined based upon the desired implementation, then the CMC logic will flag this as a fatal error for the TDM Bus. The CMC receives acknowledge bits from every blade that is present. These acknowledge bits can be compared across the discrete blade presence detect pins. If the comparison does not match across all present blades for a specific number of frames, to be determined based upon the desired implementation, then the CMC logic will also flag this as a fatal error for the TDM Shifty Bus. If one or more blades fail the acknowledge bit test, while others pass, then this event can be considered a fatal error for the blade, but not for the TDM bus In addition to data checking, a method of CLK and SYNC signal line watchdog timeout routines can also be implemented. The watchdog timeout routine detects whether there is a valid TDM clock signal and synchronization signal within a given window of time. If the clock or synchronization signals fail for a certain number of transmission frames, to be determined based upon the desired implementation, then the CMC logic can flag this as a fatal error for the TDM Bus. In cases of TDM bus fatal errors, the CMC logic can take whatever actions are available to force a failover.

The TDM bus and error check techniques described above provide significant advantages. The unique combination of features of the TDM bus provides high throughput, low latency, low pin count, data integrity, error reporting and fault recovery. These features include, for example, that all data are arranged as packets from each transmitter. Data packets provide multiple node connections. Each node receiving data checks data across all nodes, providing more efficient checksum, ECC or CRC processing. Data packets are time division multiplexed on a single serial data input/out signal line. For simplification of logic, separate clock and synchronization signal lines can be provided. Node to node return communications includes validity bit, showing received communications was error free. Transition bit provides dead time between transmitters. Error reporting on errors is propagated to higher levels of system management. Error accumulators are used to avoid false tripping during valid events (hot plug). Clock watchdog timeout is provided to monitor health of clock source. Master reported to higher level system management with ability to remove this master if it is determined to be faulty. Hot plug is provided for by data integrity functions. For redundancy, two or more TDM buses map data to common register set. One or the other TDM busses is used at one time. Health monitoring provides for switchover. Time division multiplexing guarantees no collisions. Latency is deterministic. Any node to any node communications are provided. No master arbitration is required other than clock and sync signals. The TDM communications logic can be implemented and automated in FPGA or CPLD without requiring the use of a microcontroller. Finally, clock speeds are not critical and can be mismatched between devices since synchronous clock source provided.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for communicating among a plurality of information handling systems, comprising:
   providing a communication bus configured to be coupled to a plurality of information handling systems;
   transmitting on the communication bus a data packet from each information handling system for receipt by the other information handling systems, each data packet including error check data, and all of the data and also including a plurality of device bit ranges with a device bit range being allocated to each information handling system, packets together forming a transmission frame for the communication bus;
   analyzing the error check data in each received data packet with each information handling system to determine whether data in each data packet is valid; and
   utilizing the data in each data packet within the information handling systems only if all of the data packets in the transmission frame are valid.

2. The method of claim 1, further comprising retransmitting the data packets if an invalid error check occurs within the transmission frame.

3. The method of claim 1, further comprising generating the error check data for the data packet from all of the allocated data bits.

4. The method of claim 1, further comprising configuring the communication bus to be coupled to a predetermined number of information handling systems and configuring each information handling system to transmit on the communication bus in a predefined time slot within the transmission frame.

5. The method of claim 1, further comprising receiving with each information handling system the data packet transmitted by that information handling system so that the analyzing step includes error check data for its own transmitted data packet.

6. The method of claim 1, wherein the communication bus comprises a synchronization signal line, a clock signal line and a data input/output signal line.

7. The method of claim 6, further comprising transmitting a synchronization signal on the synchronization signal line to initiate the transmission frame.

8. The method of claim 7, further comprising providing a master information handling system configured to transmit the synchronization signal and to control clock signals on the clock signal line.

9. The method of claim 1, wherein the information handling systems comprise a plurality of blades, a plurality of passthrough modules, and at least one chassis management controller.

10. A communication system for a plurality of information handling systems, comprising:
    a communication bus; and
    a plurality of information handling systems coupled to the communication bus, each information handling system transmitting on the communication bus a data packet including error check data for receipt by the other information handling systems, to analyze error check data in each received data packet, and to utilize data in each data packet only if all of the data packets are valid; and including a plurality of device bit ranges with a device bit range being allocated to each information handling system,
    wherein all the data packets together form a transmission frame for the communication bus.

11. The system of claim 10, wherein the error check data for the data packet is determined from all of the allocated data bits.

12. The system of claim 10, wherein the communication bus is configured to support a predetermined number of information handling systems and wherein each information handling system has a predefined time slot within the transmission frame.

13. The system of claim 10, wherein each information handling system is configured to receive its own data packet and to analyze the error check data for its own transmitted data packet.

14. The system of claim 10, wherein the communication bus comprises a synchronization signal line, a clock signal line and a data input/output signal line.

15. The system of claim 14, wherein one of the information handling systems is a master information handling system configured to transmit a synchronization signal on the synchronization signal line to initiate a transmission frame and to control clock signals on the clock signal line.

16. The system of claim 10, wherein the information handling systems comprise a plurality of blades, a plurality of passthrough modules, and at least one chassis management controller.

17. The system of claim 16, wherein the data packets for the blades comprise predetermined data bit ranges for the passthrough modules and the chassis management controller, wherein the data packets for the passthrough modules comprise predetermined bit ranges for blades, and wherein the data packets for the chassis management controller comprise predetermined bit ranges for blades.

18. The system of claim 16, wherein each information handling system comprises a module configured to interface with the communication bus.

19. An information handling system configured to communicate on a communication bus, comprising:
    an input buffer configured to be coupled to a communication bus;
    an output buffer configured to be coupled to a communication bus;

control circuitry coupled to the output buffer and the input buffer, the control circuitry transmitting a data packet through the output buffer including error check data for receipt by other information handling systems on the communication bus and configured to receive through the input buffer data packets from other information handling systems, the data packet also including a plurality of device bit ranges with a device bit range being allocated to one of a plurality of information handling systems also transmitting on the communication bus;

wherein the control circuitry is further configured to analyze error check data in each received data packet and to utilize data in each data packet only if a plurality of data packets within a transmission frame are valid; and wherein data packets from each of the information handling systems on the communication bus together form the transmission frame for the communication bus.

20. The information handling system of claim 19, wherein the control circuitry is further configured to communicate in a predetermined time slot within the transmission frame.

21. The information handling system of claim 19, wherein control circuitry is further configured to utilize data in each data packet only if all of the data packets within the transmission frame are valid.

22. The information handling system of claim 20, wherein control circuitry is further configured to utilize data in each data packet only if all of the data packets within the transmission frame are valid.

* * * * *

UNITED STATES PATENT AND TRADEMARK OFFICE
CERTIFICATE OF CORRECTION

PATENT NO. : 7,848,232 B2  Page 1 of 1
APPLICATION NO. : 11/520326
DATED : December 7, 2010
INVENTOR(S) : John Loffink et al.

It is certified that error appears in the above-identified patent and that said Letters Patent is hereby corrected as shown below:

In claim 1, column 15, line 37, after "check data" delete ", and all of the data".

In claim 1, column 15, line 40, before "packets" insert --and all of the data--.

In claim 10, column 16, line 19, delete "to analyze" and insert --analyzing--.

In claim 10, column 16, line 20, delete "to utilize" and insert --utilizing--.

In claim 10, column 16, line 21, delete "valid;" and insert --valid,--.

In claim 10, column 16, line 22, before "including" insert --the data packet--.

In claim 10, column 16, line 24, after "system" delete "," and insert --;--.

In claim 19, column 17, line 9, delete "a" and insert --each--.

Signed and Sealed this
First Day of February, 2011

David J. Kappos
*Director of the United States Patent and Trademark Office*